No. 659,116. Patented Oct. 2, 1900.
F. L. WHITE.
BALING PRESS.
(Application filed June 21, 1900.)
(No Model.) 2 Sheets—Sheet 1.
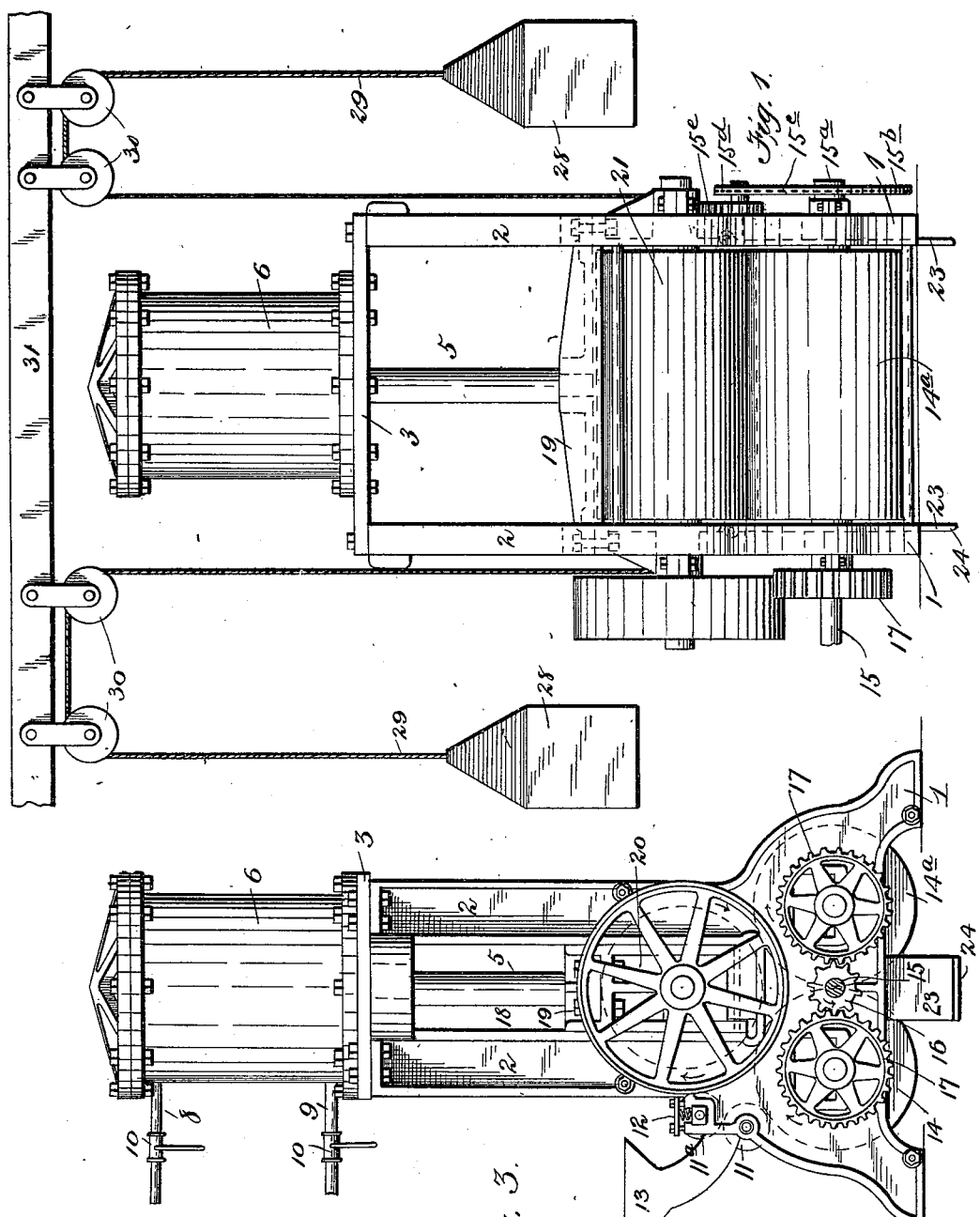

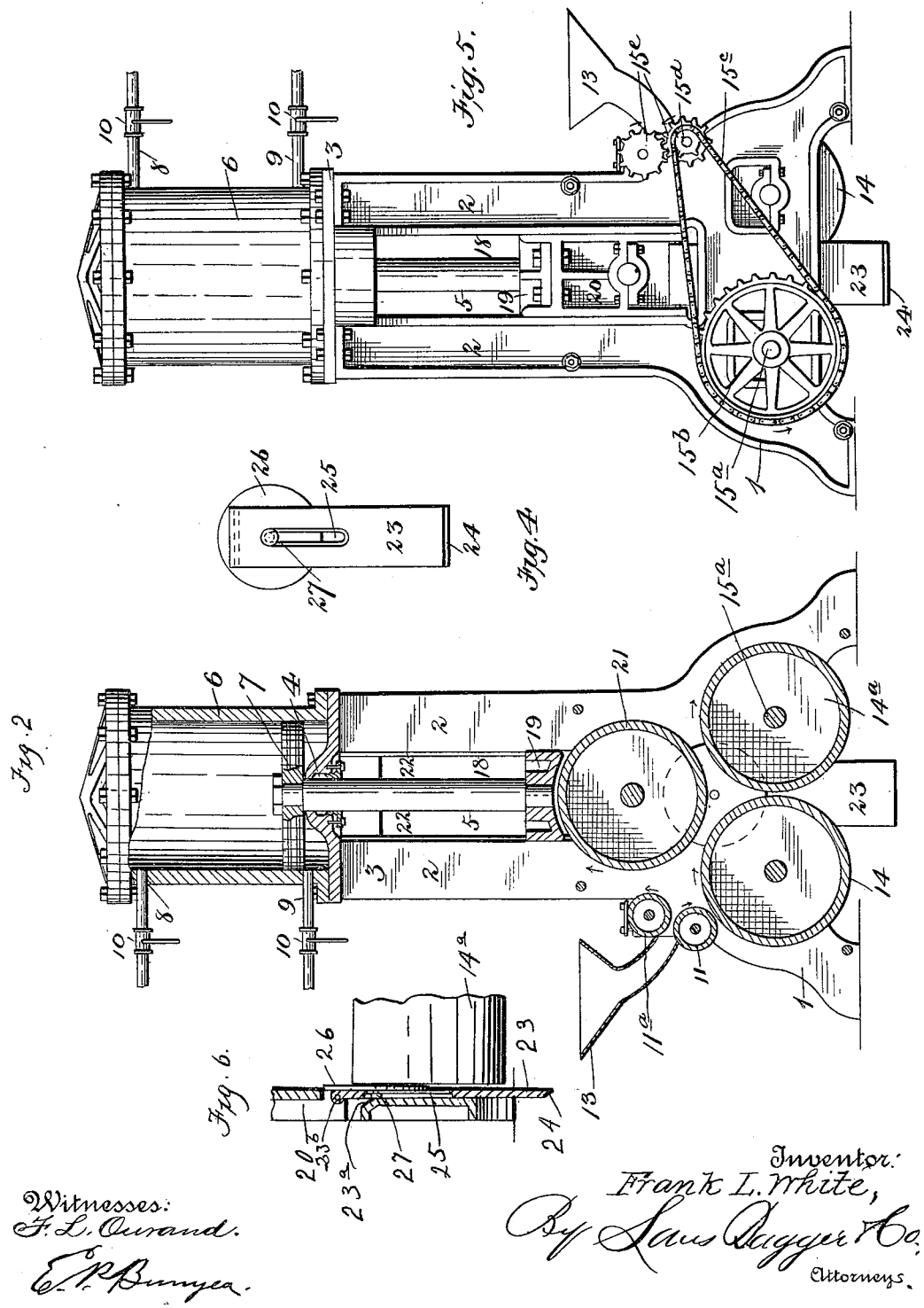

UNITED STATES PATENT OFFICE.

FRANK L. WHITE, OF PINE BLUFF, ARKANSAS, ASSIGNOR OF ONE-HALF TO EDWARD D. RUSSELL, OF SAME PLACE.

BALING-PRESS.

SPECIFICATION forming part of Letters Patent No. 659,116, dated October 2, 1900.

Application filed June 21, 1900. Serial No. 21,085. (No model.)

*To all whom it may concern:*

Be it known that I, FRANK L. WHITE, a citizen of the United States, residing at Pine Bluff, in the county of Jefferson and State of Arkansas, have invented new and useful Improvements in Baling-Presses, of which the following is a specification.

My invention relates to baling-presses of the type designed to form a round bale from a continuous strip or bat of cotton or similar material; and the objects of the same are to provide simple and efficient mechanism which will automatically increase the pressure upon the bale from the initial point in starting to roll said bale until it is finished, and to provide for the ready removal of the bale when compressed. I attain these desirable objects by means of the construction shown in the accompanying drawings, in which—

Figure 1 is a front view of a machine made in accordance with my invention. Fig. 2 is a central vertical section through the same. Fig. 3 is a side view. Fig. 4 is a plan view of a sliding plate having an adjustable disk thereon to form the end of the bale. Fig. 5 is a side view of the opposite side from that shown in Fig. 3. Fig. 6 is a partial vertical section of one of the sliding plates and disks for compressing the ends of the bale.

Like numerals of reference designate like parts wherever they occur in the different views.

In said drawings the numeral 1 designates the base-sills of the framework of the machine, and 2 the uprights rising from the sills. At the top of the uprights 2 is a cross-plate 3, having a central aperture 4, through which a piston-rod 5 works. Supported upon the cross-plate 3 is a cylinder 6, and the piston-rod 5 passes up through the aperture 4 in the cross-plate 3 and into the cylinder and is provided with a piston-head 7, which fits the inner surface of said cylinder. An inlet-port 8 and an outlet-port 9 communicate with the cylinder 6. Valves 10 10 are provided for exhausting the cylinder when it is desired to remove the bale after compressing it. Journaled at their ends in the uprights 2 are the feed-rollers 11 11$^a$. The upper roller 11$^a$ has a spring 12 bearing upon its journal-block at each end to vary the pressure and to permit inequalities in the bat to pass between the rollers. A curved hopper 13 is provided for feeding the end of the bat into the machine. Two base-rollers 14 14$^a$ are journaled at their ends in the uprights 2 in substantially the same horizontal plane, and these two rollers are revolved in the same direction, as indicated by the arrows, by the intermediate shaft 15, which carries at one end a pinion 16, which meshes with the cogged wheels 17 on the ends of the shafts of the base-rollers 14 14$^a$. This shaft 15 extends beyond the side of the machine and may be driven by any suitable power. The uprights 2 are slotted at 18, and a cross-head 19 is mounted on the end of the piston-rod 5 and slides in said slots. The cross-head 19 is provided at its ends with bearing-blocks 20, in which a pressure-roller 21 is journaled at its ends. The bearing-blocks 20 are fitted into cut-away portions or grooves 22 in the uprights. Sliding plates 23 are pivoted at 23$^B$ to the bearing-blocks 20 at opposite ends of the pressure-roller 21. The plates 23 are beveled at their lower ends at 24, and the uprights 2 are correspondingly beveled at 23$^a$, Fig. 6, at the bottom of the slots 18, in order that when the sliding plates 23 are at the upper limit of their movement the beveled portions 23$^a$ and 24 register and allow the plates 23 to swing outward to permit the easy removal of the bale. Slots 25 are formed centrally in the plates 23, and disks 26 are provided with hubs 27, which pass through the slots and permit the disks to move freely up and down and revolve therein. These disks 26 serve to compress the ends of the bales and have a free movement in the slots 25. The bevels in the plates 23 and on the uprights 2 fit together when the bale has been formed, and thus relieve the end pressure for the removal of said bale. A pulley on the end of the presser-roll shaft receives a belt from any suitable source of power to revolve the roller 21. Counterweights 28 are attached to cables 29, passing over pulleys 30, depending from a beam 31, secured above the machine, the opposite ends of the cables 29 being attached to the ends of the shaft of the presser-roller 21. The sprocket-wheel 15$^b$ on the end of shaft 15$^a$ drives a sprocket-chain 15$^c$, which passes around a small sprocket 15$^d$ on one of the feed-roller shafts, and said feed-rollers are revolved by the cog-gears 15ᵉ, as shown in Fig. 5.

The operation of my machine is as follows: A strip or bat of cotton or other material is fed into the machine between the feed-rollers 11 11ᵃ. The cylinder 6 may be filled with compressed air or steam above the piston-head 7, thus forcing the presser-roller 21 down upon the bat as it passes over the base-rollers 14 14ᵃ. As the end of the bat is turned back between the rollers 14, 14ᵃ, and 21 it forms a roll or bale, which the presser-roll continuously presses upon with increasing force, owing to the fact that the piston-head is pressed upward against the column of compressed air in the cylinder. The disks 26 serve to form smooth ends to the bale, and when a bale of the desired size has been formed and pressed the valves 10 are opened to exhaust the air from the cylinder, when the counterweights 28 descend and raise the presser-roll from the bale, so that it may be removed. The sliding plates 23 move slightly outward into the grooves 22 as the disks rise and give a clear space for removal of the bale.

From the foregoing it will be seen that my device is simple in construction, comparatively quick in operation, and efficient in use.

Having thus fully described my invention, what I claim is—

1. In a baling-press, a cylinder, a piston mounted to reciprocate in said cylinder, a presser-roller journaled in bearing-blocks connected to said piston, said bearing-blocks sliding vertically in the frame and carrying sliding plates, disks mounted to slide on the plates, and base-rollers journaled in the frame, substantially as described.

2. In a baling-press, the combination of the feed-rollers, the base-rollers journaled in the frame of the machine, means for revolving said rollers in the same direction, a cylinder, a piston moving in said cylinder, a pressure-roller connected to said piston, and carrying sliding plates having disks freely mounted thereon, base-rollers journaled in the frame, and counterweights connected to the presser-roll shaft, substantially as described.

3. In a baling-press, a cylinder, a piston moving therein, a presser-roller connected to said piston, sliding plates carried by the piston, disks mounted to move freely on said sliding plates, base-rollers below said presser-roller, and means for relieving the pressure behind the piston-head, substantially as described.

In testimony whereof I have hereunto set my hand in presence of two subscribing witnesses.

FRANK L. WHITE.

Witnesses:
J. W. CRAWFORD,
MARY HUGGARD.